United States Patent
Gasmena

(10) Patent No.: US 6,169,066 B1
(45) Date of Patent: Jan. 2, 2001

(54) WATERBORNE HYDROPHOBIC CLEANING AND COATING COMPOSITION

(75) Inventor: Roland L. Gasmena, Benton, AR (US)

(73) Assignee: Ameron International Corporation, Pasadena, CA (US)

( * ) Notice: Under 35 U.S.C. 154(b), the term of this patent shall be extended for 0 days.

(21) Appl. No.: 09/193,187

(22) Filed: Nov. 17, 1998

(51) Int. Cl.$^7$ .................. C11D 3/02; C11D 3/20
(52) U.S. Cl. .......... 510/466; 510/122; 510/179; 510/180; 510/219; 510/241; 510/243; 510/400
(58) Field of Search .................... 510/122, 180, 510/179, 219, 241, 243, 400, 466

(56) References Cited

U.S. PATENT DOCUMENTS

| | | | |
|---|---|---|---|
| 2,757,094 | 7/1956 | Guss | 106/8 |
| 2,993,866 | 7/1961 | Vaughn et al. | 252/171 |
| 3,212,909 | 10/1965 | Leigh | 106/13 |
| 3,249,550 | 5/1966 | Metters | 252/161 |
| 3,579,540 | 5/1971 | Ohihausen | 260/33.4 |
| 3,620,820 | 11/1971 | Hess | 117/124 |
| 4,005,028 | 1/1977 | Heckert et al. | 252/99 |
| 4,005,030 | 1/1977 | Heckert et al. | 252/140 |
| 4,181,622 | 1/1980 | Gavin | 252/143 |
| 4,212,759 | 7/1980 | Young et al. | 252/119 |
| 4,306,990 | 12/1981 | Goodman et al. | 252/174.15 |
| 4,311,608 | 1/1982 | Maurice | 252/143 |
| 4,539,145 | 9/1985 | Alvarez et al. | 252/542 |
| 4,615,738 | 10/1986 | Sanders, Jr. et al. | 106/287.13 |
| 4,689,168 | 8/1987 | Requejo | 252/139 |
| 4,810,407 | 3/1989 | Sandvick | 252/90 |
| 4,859,359 * | 8/1989 | DeMatteo et al. | 252/174.15 |
| 4,948,531 | 8/1990 | Fuggini et al. | 252/544 |
| 4,959,105 | 9/1990 | Neidiffer et al. | 134/3 |
| 4,960,533 | 10/1990 | Wisniewski et al. | 252/142 |
| 5,080,824 * | 1/1992 | Bindl et al. | 252/174.12 |
| 5,145,898 * | 9/1992 | Narula et al. | 524/310 |
| 5,147,575 | 9/1992 | Hampton, Sr. | 252/171 |
| 5,254,284 | 10/1993 | Barone et al. | 252/174.15 |
| 5,518,533 * | 5/1996 | Howe | 106/3 |
| 5,710,113 * | 1/1998 | Wells et al. | 510/122 |

* cited by examiner

*Primary Examiner*—Kery Fries
(74) *Attorney, Agent, or Firm*—Christie, Parker & Hale, LLP

(57) ABSTRACT

Waterborne hydrophobic cleaning and coating compositions of this invention are prepared by combining one or more silicone ingredient, with water, and at least one solubilizing agent capable of making the silicone ingredient miscible in water to form a homogeneous mixture. Optionally, cleaning and costing compositions of this invention can include volatilizing agents, to reduce application time, and colorizing agents, to provide a desired composition color. The silicone ingredient can be selected from the group of silicone resins, silicone oils, and mixtures thereof. Preferably, the silicone ingredient comprises a functional group that is capable of forming a bond with a chemical group of the underlying substrate. Preferably, the solubilizing agent is one that is selected from the group consisting of organic solvents, alcohols, ketones, acetates, ethers, esters, aromatics, and mixtures thereof that are soluble in water and that are capable of cleaning a substrate surface. Coating compositions of this invention are capable of simultaneously cleaning, preparing a substrate surface, and providing a protective thin-film hydrophobic surface thereon at ambient temperature without conducting a multi-step process and without having to use special equipment.

15 Claims, No Drawings

WATERBORNE HYDROPHOBIC CLEANING AND COATING COMPOSITION

FIELD OF THE INVENTION

This invention relates to a hydrophobic protective coating composition and, more particularly, to a hydrophobic protective coating composition that is waterborne and that is formulated to simultaneously clean the applied-to substrate surface and provide a hydrophobic thin-film coating thereon.

BACKGROUND OF THE INVENTION

Coating compositions that are formulated for application onto substrates such as optical surfaces, e.g., vehicle windshields or windows, windows on marine vessels and the like, to provide a hydrophobic surface thereon are known in the art. These coatings are desired because they promote water shedding from the optical surface without the need for mechanical wiping, or with reduced mechanical assistance.

Typically, such hydrophobic coating compositions known in the art are formed from materials that, once applied to the substrate surface, only temporarily reside thereon and do not form a bond thereto. The failure of such coating products to form a bond with the underlying surface ultimately reduces the length of time that the coating remains on the substrate surface, thereby limiting the effective duration during which the product can provide a desired hydrophobic effect.

Additionally, hydrophobic coatings known in the art are typically applied as a final step of a multi-step system, requiring either a previous cleaning step or previous cleaning and surface preparation steps. For example, in a three-step process, the desired substrate surface is first cleaned to remove any surface dirt or debris, and the cleaned surface is then prepared to accept the hydrophobic coating by subsequently applying a suitable preparation agent thereto: In some instances, depending on the particular hydrophobic coating system, it may be required that the surface preparation agent be allowed to set for a period of time and/or be exposed to certain activating or curing temperatures before applying the hydrophobic coating and/or be exposed to certain curing temperatures. In certain instances it may also be required that the applied hydrophobic coating composition be cured at a certain temperature for a certain period of time to provide the desired hydrophobic surface. Accordingly, the task of achieving a hydrophobic surface coating using such known compositions can involve a time and labor intensive process.

It is, therefore, desirable that a coating composition be formulated that will enable application to an optical or other substrate surface to produce a hydrophobic coating without the need to clean and prepare the substrate surface using separate products or steps. It is desired that such coating composition be formulated to provide a hydrophobic surface coating having a long service life. It is also desired that such coating composition be fast and easy to use without the need for special skills or tools.

SUMMARY OF THE INVENTION

Waterborne hydrophobic cleaning and coating compositions of this invention are prepared by combining one or more silicone ingredients, with water, and at least one solubilizing agent capable of making the silicone ingredient miscible in water to form a homogeneous mixture. Optionally, cleaning and coating compositions of this invention can include volatilizing agents, to reduce application time, and colorizing agents, to provide a desired composition color. The silicone ingredient can be selected from the group of silicone resins, silicone fluids, and mixtures thereof. Preferably, the silicone ingredient comprises a functional group that is capable of forming a bond with a chemical group of the underlying substrate. Preferably, the solubilizing agent is one that is selected from the group consisting of organic solvents, alcohols, ketones, acetates, ethers, esters, aromatics and mixtures thereof that are soluble in water and that are capable of cleaning a substrate surface.

Coating compositions of this invention are capable of simultaneously cleaning, preparing a substrate surface, and providing a protective thin-film hydrophobic surface thereon at ambient temperature without conducting a multi-step process and without having to use special equipment. Coating compositions of this invention, when applied to an optical glass surface, form a bond therewith that improves the duration of such protective surface.

DETAILED DESCRIPTION OF THE INVENTION

Hydrophobic coating compositions of this invention are prepared by combining one or more silicone ingredients, with water, one or more solubilizing agents or solvents, an optional volatilizing agent, and an optional coloring agent. Coating compositions of this invention simultaneously clean the substrate surface and provide a hydrophobic coating thereon in a single step at ambient temperature without special application techniques or equipment. Coating compositions of this invention are believed to form a bond with the underlying substrate, in the case of the substrate being glass, to provide a hydrophobic coating thereon that has an improved service life when compared to conventional hydrophobic coating products.

The silicone ingredient is used to provide a thin film low energy coating that provides hydrophobicity to the applied-to substrate surface. The silicone ingredient can be selected from the group of silicone intermediates, silicone resins, silicone fluids, and mixtures thereof. In an example embodiment, a silicone resin and a silicone fluid is used because the silicone resin is responsible for forming a low surface energy coating to the substrate while the silicone fluid assists in lubricity during application and also imparts an immediate hydrophobicity to the glass, protecting the silicone resin from self condensation during its curing process. If the silicone resin is used without the silicone fluid, improper curing of the coated composition could result by initial contact with environmental moisture or water, thereby reducing the longevity of the coating hydrophobicity performance. This is known to occur due to the alkoxy groups being reactive with such moisture to provide hydroxy functionality that could promote self condensation.

Silicone resins useful for preparing hydrophobic coating compositions of this invention include alkoxy and hydroxy-functional polysiloxanes. Preferred silicone resins are limited to polyalkylene oxide modified polysiloxanes having a weight average molecular weight in the range of from about 600 to 3,500, and having an ethylene oxide content greater than about 75 percent. A particularly preferred silicone resin is polyalkylene oxide modified polysiloxane available from, for example, OSI Specialties, Inc., of Tarrytown, N.Y. under the product name Silwet 7000 series.

It is desired that in the range of from about 2 to 15 percent by weight of the silicone resin be used based on the weight of the total coating composition. Using less than about 2 percent by weight of the silicone resin can produce a coating composition that does not have a desired degree of hydrophobicity for a particular application. Using greater than about 15 percent by weight of the silicone resin can produce a coating composition that is difficult to apply, and that provides an oily film after application that can adversely affect optical clarity. In a preferred embodiment, approximately 5 percent by weight of the silicone resin is used to prepare the coating composition.

Silicone fluid is used to in combination with the silicone resin to also provide desired hydrophobic properties to the applied coating. Specifically, the silicone fluid is used to reduce the solubility of the silicone resin, thereby improving its solubility with water and making it easier to apply to a desired substrate. Hydrophobic coating compositions of this invention can be prepared using one or a combination of silicone fluids, e.g., by using two or more different types of silicone fluids, or by using similar types of silicone fluids having different viscosities.

Silicone fluids useful in preparing hydrophobic coating compositions of this invention include those having alkyl or polyalkyl groups, and having a viscosity in the range of from about 1 to 400 centistokes. Silicone fluids having a viscosity of less than about 1 centistoke have properties of poor lubricity and high volatility, making them a hazardous component and undesirable for use in forming hydrophobic coating compositions of this invention. Silicone fluids having a viscosity of greater than about 400 centistokes have high viscosities that could cause the coated composition to be hazy and have reduced optical clarity, probably due to poor stability in water. However, if necessary, higher viscosity silicone fluids can be used provided that adequate solvent ingredients are used to ensure homogeneity in water. A preferred silicone fluid is polydimethyl silicone fluid (PDMS) having a viscosity of approximately 5 centistokes such as that commercially available, for example, from Dow Corning Corp., under the product name DC-200.

It is desired that in the range of from about 0.01 to 5 percent by weight of the silicone fluid be used based on the weight of the total coating composition. Using less than about 0.01 percent by weight of the silicone fluid can produce a coating composition that does not provide the desired degree of hydrophobicity to the substrate surface. Using greater than about 5 percent by weight of the silicone fluid can produce a coating composition that is difficult to apply, and that produces an oily surface that may affect optical clarity. In a preferred embodiment, where the above-discussed silicone resin is used, approximately 0.2 percent by weight of the silicone fluid is used to prepare the coating composition.

A suitable amount of water is used to provide a water carrier for the other ingredients, thereby producing a waterborne hydrophobic coating composition. In the range of from about 30 to 60 percent by weight deionized water is used based on the total weight of the coating composition. Using less than about 30 percent by weight water will produce a solvent heavy composition that will both have a tendency to separate during storage and that will have an increased manufacturing cost, due to the increase volume of relatively expensive non-water chemical ingredients. Using greater than about 60 percent by weight water will produce a composition having reduced cleaning effectiveness, thereby requiring repeat or multiple coating applications. In a preferred embodiment, approximately 50 percent by weight of water is used based on the total weight of the composition.

Solubilizing agents or solvents are used to solubilize the silicone ingredient in water, to both produce a homogeneous mixture that does not separate into different phases within a desired amount of time, and to clean the substrate. The solubilizing agent can be selected from the group consisting of alcohols, organic solvents, ketones, acetates, ethers, esters, aromatics, and mixtures thereof that are miscible with water to promote the miscibility of the silicone ingredient. In an example embodiment, where more than one silicone ingredient is used having different viscosities, it may be necessary to use different solubility agents to fully solubilize each such silicone ingredient into the water phase to ensure homogeneity. Accordingly, the type and/or number of solubilizing agents used for preparing hydrophobic coating compositions of this invention can vary depending on the type and number of silicone ingredient(s) that are used. In an example embodiment, where the silicone ingredient comprises the above-discussed silicone resin and silicone fluid, the solubility agents are an organic solvent and an alcohol.

Organic solvents are useful for solubilizing higher viscosity silicone ingredients, such as silicone resins and the like, into the water phase. Organic solvents useful in preparing hydrophobic coating compositions of this invention include non-alcoholic solvents such as ethers, esters, aromatics and the like. Specific solvents include, for example, MEK, MIBK, n-propyl ketone, methyl isoamyl ketone, methyl amyl ketone, isobutyl acetate, butyl acetate, ethyl 3 ethoxy propionate, xylene and higher boiling aromatic solvents such as Chevron 25, hexyl acetate, heptyl acetate and the like. A particularly preferred organic solvent is propylene glycol methyl ether.

It is desired that in the range of from about 5 to 40 percent by weight of the organic solvent be used based on the weight of the total coating composition. Using less than about 5 percent by weight of the organic solvent can produce a coating composition having a lower degree of silicone miscibility in water than desired, thereby producing a non-homogeneous composition. Using greater than about 40 percent by weight of the organic solvent will produce a coating composition that will have a high evaporation and increased VOC content, thereby making the composition difficult to work with and environmentally unfriendly. In a preferred embodiment, approximately 20 percent by weight of the organic solvent is used to prepare the coating composition.

Alcohols are a useful solubilizing agents for solubilizing lower viscosity silicone ingredients, such as silicone fluids and the like, into the water phase. A preferred alcohol for preparing hydrophobic coating compositions of this invention is isopropyl alcohol, and can be used in the range of from 5 to 40 percent by weight based on the total weight of the composition. Using less than about 5 percent by weight of the alcohol solvent can produce a coating composition having a lower degree of silicone miscibility in water than desired, thereby producing a non-homogeneous composition. Using greater than about 40 percent by weight of the alcohol solvent will produce a coating composition having a high evaporation rate and a low flash point, thereby making the composition difficult and potentially dangerous to work with. In a preferred embodiment, approximately 20 percent by weight of the alcohol solvent is used to prepare the coating composition.

A volatilizing agent can optionally be used in applications where fast air drying is desired. For example, use of a volatilizing agent is desired when the hydrophobic coating composition is formulated for spray application onto a vehicle windshield to permit fast drying after it is sprayed onto the windshield and wiped with a towel, thereby minimizing application time and effort. Suitable volatilizing agents include those conventionally used for spray applied window cleaners such as ammonia and the like. A preferred volatilizing agent is aqua ammonia. Up to about 10 percent by weight of the ammonia volatilizing agent can be used based on the total weight of the coating composition. In a preferred embodiment, approximately 1 percent by weight of the volatilizing agent is used based on the total weight of the coating composition.

A coloring agent can optionally be used to provide a desired color to the otherwise colorless liquid mixture. The choice of coloring agent depends on the particular color that is desired for the composition. For example, if a blue color is desired, the coloring agent can be selected from the group of well known copper ion-containing coloring ingredients. In an example embodiment, where a blue color is desired, the coloring agent is cupric sulfate+$5H_2O$. Up to about 1 percent by weight of the coloring agent can be used based on the total weight of the composition. In a preferred embodiment, approximately 0.05 percent by weight of the coloring agent is used based on the total weight of the coating composition.

A feature of coating compositions of this invention is that they provide a simultaneous cleaning, preparation and coating action in one step. The coating composition is formulated to clean the substrate that it is applied to, while at the same time preparing the substrate surface and coating it with a thin-film hydrophobic composition, thus eliminating the need to perform separate cleaning and preparation steps. Specifically, the combination of solvents that are used to solubilize the silicone ingredient provides an excellent in situ cleaner, while the silicone ingredient provides the desired hydrophobicity in the form of a thin-film coating that covers the cleaned substrate surface. Additionally, the solvents act to retain the silicone ingredient(s) in water without phase separation.

Another feature of coating compositions of this invention is that they provide a hydrophobic coating that lasts longer than conventional hydrophobic coatings. The reasons for this is theorized to be due to chemical bonds that are formed between the coating composition and the optical substrate surface. Specifically, it is believed that the functional groups, e.g., hydroxyl groups, of the silicone intermediate, form hydrogen bonds with the oxygen groups within the glass. The presence of such hydrogen bonds cause the hydrophobic coating to remain in contact with the underlying substrate surface, thereby providing an enhanced duration of hydrophobic surface protection when compared to coatings that lack such bonding.

The following examples are provided for purposes of better understanding hydrophobic compositions of this invention.

EXAMPLE NO. 1

A hydrophobic coating composition was prepared by combining, in a stainless steel mixing jacket, approximately 54 percent by weight deionized water, 20 percent by weight isopropanol, 20 percent by weight propylene glycol methyl ether organic solvent, 5 percent by weight SILWET 7001 silicone resin, 0.2 percent by weight DC-200 (5 CST) silicone fluid, 1 percent by weight aqua ammonia, and 0.05 percent by weight cupric sulfate+$5H_2O$. The ingredients were mixed under slow agitation for approximately 15 minutes to produce a final mixture having a uniform blue color throughout. The ingredients could either be combined together in a single step or can be combined as a two-step procedure, e.g., the volatilizing agent and the colorizing agent can be combined as a second part to the earlier-combined remaining ingredients. Such a two-step mixing process can be used to produce a coating composition having different colors or application times to meet different product requirements.

EXAMPLE NO. 2

A hydrophobic coating composition was prepared by combining, in a stainless steel mixing jacket, approximately 54 percent by weight deionized water, 10 percent by weight isopropanol, 12.5 percent by weight propylene glycol methyl ether organic solvent, 1 percent by weight DC Z6018 silicone resin, 10 percent by weight polydimethyl silicone fluid (10 centistoke), 2.5 percent by weight polydimethyl silicone fluid (350 centistoke), 5 percent by weight acetic acid, and 5 percent by weight citric acid. The ingredients were mixed under slow agitation for approximately 15 minutes to produce a final mixture having a uniform blue color throughout.

Although hydrophobic coating compositions of this invention have been described as being useful for coating optical substrates, it is important to know that coating compositions of this invention can also be used to simultaneously clean and provide a hydrophobic coating on other substrate materials where an hydrophobic surface is desired, such as metals, ceramics, and porcelain. Additionally, although coating compositions of this invention have been described as providing a protective hydrophobic thin-film surface on substrates, it is to be understood that such coating compositions more generally provide a low-energy thin film surface that not only sheds water from a substrate surface, but also functions to shed dirt, dust and other airborne debris that would otherwise accumulate on an otherwise unprotected substrate surface. Accordingly, coating compositions of this invention can be used to provide a low-energy thin film coating to protect a substrate surface against the unwanted accumulation of water, dirt, dust and the like.

What is claimed is:

1. A water-borne low-energy cleaning and coating composition prepared by combining:
   a silicone resin selected from the group consisting of alkoxy-functional polysiloxanes and hydroxy-functional polysiloxanes; with
   a silicone fluid;
   water; and
   a sufficient amount of solubilizing agent to make the silicone ingredient miscible in water to form a homogenous mixture.

2. The cleaning and coating composition as recited in claim 1 wherein the silicone resin comprises an alkoxy or hydroxy-functional polysiloxane, and the silicone fluid has a viscosity of less than 400 centistokes.

3. The cleaning and coating composition as recited in claim 2 comprising in the range of from 2 to 15 percent by weight polysiloxane, and in the range of from 0.1 to 5 percent by weight silicone fluid based on the total weight of the composition.

4. The cleaning and coating composition as recited in claim 1 wherein the silicone resin is a polyalkylene oxide modified polysiloxane having a weight average molecular weight in the range of from 600 to 3,500, and having an ethylene oxide content greater than 75 percent.

5. The cleaning and coating composition as recited in claim 1 wherein the solubilizing agent is selected from the group consisting of alcohols, organic solvents, ketones, acetates, ethers, esters, aromatics, and mixtures thereof.

6. The cleaning and coating composition as recited in claim 5 wherein the solubilizing agent comprises:

an alcohol; and an ether.

7. The cleaning and coating composition as recited in claim 1 further comprising a volatilizing agent selected from the group consisting of ammonias.

8. The cleaning and coating composition as recited in claim 1 comprising in the range of from 2 to 20 percent by weight combined silicone resin and silicone fluid, 30 to 60 percent by weight water, and 10 to 50 percent by weight solubilizing agent based on the total weight of the coating composition.

9. A water-borne low-energy cleaning and coating composition prepared by combining:

an alkoxy or hydroxy-functional polysiloxane; with a silicone fluid having a viscosity of less than 400 centistokes; and water; and a sufficient amount of solubilizing agent to make the silicone ingredient miscible in water to form a homogenous mixture.

10. The cleaning and coating composition as recited in claim 9 wherein the polysiloxane is a polyalkylene oxide modified polysiloxane having a weight average molecular weight in the range of from about 600 to 3,500, and having an ethylene oxide content greater than 75 percent.

11. The cleaning and coating composition as recited in claim 9 comprising in the range of from 2 to 15 percent by weight of the polysiloxane, and in the range of from 0.1 to 5 percent by weight of the silicone fluid based on the total weight of the composition.

12. The cleaning and coating composition as recited in claim 9 wherein the solubilizing agent is selected from the group consisting of alcohols, organic solvents, ketones, acetates, ethers, esters, aromatics, and mixtures thereof.

13. The cleaning and coating composition as recited in claim 12 wherein the solubilizing agent comprises:

an alcohol; and an ether.

14. The cleaning and coating composition as recited in claim 9 comprising in the range of from 2 to 15 percent by weight polysiloxane, 30 to 60 percent by weight water, and 10 to 50 percent by weight solubilizing agent based on the total weight of the coating composition.

15. A water-borne low-energy cleaning and coating composition prepared by combining:

in the range of from 2 to 15 percent by weight, based on the total weight of the composition, polyalkylene oxide modified polysiloxane having a weight average molecular weight in the range of from 600 to 3,500, and having an ethylene oxide content greater than 75 percent; with in the range of from 0.01 to 5 percent by weight, based on the total weight of the composition, silicone fluid having a viscosity of less than 400 centistokes; and water; and a sufficient amount of solubilizing agent to make the silicone ingredient miscible in water to form a homogenous mixture.

\* \* \* \* \*